United States Patent [19]

Frost et al.

[11] 4,001,028
[45] Jan. 4, 1977

[54] METHOD OF PREPARING CRACK-FREE MONOLITHIC POLYCRYSTALLINE CORDIERITE SUBSTRATES

[75] Inventors: Rodney I. Frost; Irwin M. Lachman; Paul H. Rieth, all of Corning, N.Y.

[73] Assignee: Corning Glass Works, Corning, N.Y.

[22] Filed: May 28, 1974

[21] Appl. No.: 473,396

[52] U.S. Cl. .............................. 106/62; 106/40 R; 106/68; 423/118; 423/213.5; 423/328
[51] Int. Cl.$^2$ ................. C04B 35/04; C04B 33/00; C04B 35/14; C01F 1/00
[58] Field of Search ..................... 106/40 R, 62, 68; 423/118, 213.5, 328

[56] References Cited

UNITED STATES PATENTS

| | | | |
|---|---|---|---|
| 2,731,355 | 1/1956 | Skinner | 106/62 |
| 2,786,772 | 3/1957 | Stewart et al. | 106/40 R |
| 2,864,919 | 12/1958 | Stringfellow | 106/62 X |
| 3,026,212 | 3/1962 | Fay et al. | 106/68 X |
| 3,146,115 | 8/1964 | Wishon et al. | 106/68 X |
| 3,389,001 | 6/1968 | Blackburn et al. | 106/40 R X |
| 3,473,999 | 10/1969 | Muchow | 106/62 X |

FOREIGN PATENTS OR APPLICATIONS 836,059   6/1960   United Kingdom ................. 106/62

*Primary Examiner*—Winston A. Douglas
*Assistant Examiner*—William G. Wright
*Attorney, Agent, or Firm*—Richard N. Wardell; Clarence R. Patty, Jr.

[57] ABSTRACT

Cracking of large monolithic cordierite segments and in particular monolithic honeycombed substrates having a matrix of thin walls forming a multiplicity of open ended cells extending from one end of the substrate to the other end is reduced or eliminated by limiting the amount of raw clay used in formulating the clay-talc-alumina raw material batch. The raw clay may be eliminated entirely but is preferably at least 10% of the whole batch and not more than 31% of the whole batch with the balance of the clay constituent to the raw material batch being calcined clay. The raw material batch is preferably formulated to yield at least 90% cordierite phase upon reaction during sintering.

6 Claims, No Drawings

4,001,028

METHOD OF PREPARING CRACK-FREE MONOLITHIC POLYCRYSTALLINE CORDIERITE SUBSTRATES

BACKGROUND OF THE INVENTION

Honeycombed sintered ceramics are of current interest as substrates for catalytically active substances used in apparatus for the conversion of hydrocarbon, carbon monoxide and nitrogen oxides from automobile exhaust gas. Other uses for such inorganic substrates outside of the auto industry are also recognized.

Several properties are required of ceramic substrates if they are to survive operation in automobile catalytic reactors. Two of these properties were the subject of copending U.S. patent applications Ser. Nos. 412,862 and 412,863 (now U.S. Pat. No. 3,950,175), both filed Nov. 5, 1973. The two copending applications relate to substrates consisting primarily of polycrystalline cordierite, the former concerned with very low thermal expansion compositions and the latter with batch materials stimulating significant coarse porosity in the sintered ceramic. The present invention pertains to the same basic cordierite compositions and to methods of producing large honeycombed substrates without incurring significant cracking of the ware during thermal processing. Some investigators have previously suggested the use of calcined clays in cordierite compositions but generally for the purpose of shrinkage or heat shock resistance. U.K. Pat. Nos. 886,718 and 888,227 suggest prefired clay for the latter purpose while allowing up to 70 and 80 percent raw clay in the material batches. Cracking behavior as a function of raw clay in the batch was not envisioned and therefore no limit was established for the raw clay component making up the raw material batches for large ceramic bodies.

Standard substrate sizes for insertion in catalytic reactors are at least 3 inches and sometimes 5 inches in diameter. The length of the substrates vary, but from a production standpoint it would be desirable to fire substrates 16-36 inches long and then cut them to the useful length (usually about 3 inches long). Typically, however, compositions necessary for optimizing other properties (including thermal expansion and porosity) were prone to cracking when made into the elongated (16-36 inches) substrates (in the art and herein also referred to as "logs") and fired. Exceptionally slow firing schedules could be used although this is not an economically desirable result.

SUMMARY OF THE INVENTION

The inventors have now found in formulating a raw material batch comprising clay, talc and alumina raw materials for the production of elongated honeycomb substrates having a predominant cordierite phase in the sintered ware, that the firing cracking may be reduced and eliminated by limiting the amount of raw clay making up the clay constituent in the raw batch. Specifically, calcined clay (calcined at or above about 1000° C) may be substituted for the raw clay (hydrous aluminosilicate) such that the clay constituent of the batch consists of 0-31% (preferably 10-31%) raw clay based on the whole batch with the balance being calcined clay. A small amount of raw clay is preferred in the batch to aid in processing, particularly in forming (e.g., extruding) the plasticized batch. Further, the small amount of raw clay has been found sufficient to provide preferred orientation of the cordierite crystallites in the fired substrate and consequently provide a very low expansion direction in the substrate. Additional discussion on the effects of orientation and its desirability is contained in the previously noted U.S. Pat. No. 3,885,977, which is therefore incorporated herein by reference. It is preferred that the teaching of that application be followed with respect to the raw clay material selected for the present invention, that is, the raw clay should be either a delaminated (platelet) clay or a laminated (stacked) clay which can be later delaminated into platelets during processing and forming. The kaolin clays are particularly suitable.

The thin platelets of the clays advantageously orient themselves in the extruded substrates and provide an orientation to the cordierite crystallites as that phase develops during thermal processing. The oriented cordierite crystallites, being anisotropic, induce a desirable low expansion direction in the fired body. The substitution of calcined clay to prevent firing cracking in the present invention effects that result without ruining the orientation of the cordierite crystals induced by the raw clay platelets. In fact, in some cases the calcined clay may itself induce preferred orientation since there are a large number of platelets to be found in certain calcined clays. The calcined clay used in the examples by the present inventors was such a clay but the platelets therein were much less platey (i.e., more isodimensional) than the raw clay platelets which had a very high length and width to thickness ratio. The inventors have found that because of this difference in particle habit the raw clay orients itself much better than the calcined clay and also aids in orienting the calcined clay particles during the forming operation. As little as 10% of the raw clay has been found to produce significant orientation of all the clay and to aid in plastic formability of the ceramic mass.

Compositions which are the subject of this invention are in or near the cordierite primary phase field in the $MgO-Al_2O_3-SiO_2$ system and consist essentially of, on the oxide basis, 9-20% MgO, 30-50% $Al_2O_3$ and 41-56.5% $SiO_2$ (preferably 12.5-15.5% MgO, 34.2-39.5% $Al_2O_3$, 48.0 51.6% $SiO_2$). The clay-talc-alumina yielding raw materials selected in the appropriate amounts for yielding a ceramic sinter of the desired oxide analysis are generally in the range of 40-50% clay, 35-45% raw and/or calcined talc and 10-20% hydrated and/or calcined alumina. Water (25-35%) for plastic flow and extrusion aids (binders and plasticizers) for plastic formability and green strength are added to the raw materials prior to blending and forming. Extrusion aids known in the art may be used.

In fabricating sintered substrates, the raw materials are batched, blended and plasticized and are formed by conventional forming means, although the inventors prefer extrusion in preparing ceramic honeycombs having a multiplicity of cells therein extending from one end of the substrate to the other end. Particularly desirable methods of controlling the temperature of the extrusion barrel and the extrusion batch for developing uniform plasticity in the batch and a uniform surface on the extruded substrate are disclosed in pending U.S. patent applications Ser. Nos. 340,023 and 384,935 filed respectively on Mar. 12, 1973 and Aug. 2, 1973, both now abandoned. These applications are therefore incorporated herein by reference.

After forming, the green ware is dried and fired to bring about the sintering of particles and development of the cordierite phase. It is desirable, especially for low thermal expansion, that the firing schedule (and the raw materials) be selected to produce at least 90% by volume cordierite phase in the fired ceramic. A peak temperature of about 1405° C has been used successfully by the inventors herein, with a temperature hold time of about 12 hours at the peak temperature. Rates of temperature increase below 100° C/hour (in particular 40°–50° C/hour) have been used consistently in the firing schedule, but higher rates of up to 500° C/hour have occasionally been used during stages of the firing schedule when no disruptive reactions are taking place in the bodies. Rates of cooling are not critical since cordierite can survive large thermal gradients because of its low coefficient of thermal expansion. Cooling rates of about 250° C per hour are satisfactory.

It has been found by the inventors that the raw clay making up the clay component of the clay-talc-alumina raw material batch must be limited to 31% to avoid cracking in large logs fired at reasonable (e.g., 50° C/hour) heat rates. The inventors believe that raw clay undergoes a series of degradations and complex reactions during the firing cycle and that the most important reaction as it affects cracking is the formation of what is thought to be a transitory spinel-type phase in the temperature range of about 950°–1000° C. The inventors have found that the transformation in the 950°–1000° C range is an exothermic reaction which causes a large liberation of heat leading to thermal gradients and consequently stresses in the body which may ultimately result in cracking. Therefore, to avoid these eventual stresses in the body, the inventors provide a substitution of pre-calcined clay (calcined at or above about 1000° C) for most or all of the raw clay, the calcined clay having already undergone the undesirable 950°–1000° C exothermic reaction.

The ability of the elongated substrate or log being fired to withstand the thermal stresses, of course, depends on the magnitude of the stresses and ultimately the amount of raw clay being transformed. The inventors have found that the level of raw clay may not exceed 31% before cracking becomes significant in a large (cylindrical, 3–6 inches diameter, 10–40 inches long) log or any cordierite shape of similar volume and strength which experiences similar stresses produced by heat gradients when fired through the 950°–1000° C temperature range.

Other factors affecting cracking in a body are particle size and shrinkage. Particles are all preferably −325 Tyler mesh but with a median particle size greater than 1 micron (especially the clay) to avoid cracking of the ware. The inventors also prefer that the alumina of the raw batch be calcined to avoid unnecessary holds in the firing schedule allowing dehydration and avoiding excessive shrinkage in the logs. If hydrated alumina, also known as aluminum hydroxide, is used in quantities greater than 5% by weight of the batch, a heating rate of about 10° C/hour in the range of 200°–300° C or a temperature hold at about 260° C has been found desirable to avoid the detrimental effects. The talc used herein may also be raw talc and/or pre-calcined talc as talc does not appear to have adverse effects on the cracking behavior.

TABLE I

| Raw Material Oxide Analyses (Percent by Weight) | | | | | |
|---|---|---|---|---|---|
| | $SiO_2$ | $Al_2O_3$ | MgO | CaO | $K_2O + Na_2O$ |
| Georgia Kaolin Hydrite MP (APS - 9.7) | 45.3 | 38.38 | 0.04 | 0.05 | 0.31 |
| Georgia Kaolin Glomax - LL (APS - 1.9) | 53.8 | 44.4 | 0.23 | 0.05 | 0.34 |
| Pfizer MP 96–28 Montana Talc (APS - 20) | 61.1 | 0.93 | 32.2 | 0.13 | 0.03 |
| Pfizer MP 99–54 Cercron (Calcined Talc) (APS - 25) | 63.9 | 0.98 | 34.0 | 0.12 | 0.02 |
| Penn Glass Sand Corp. Supersil Fused Silica (-200 mesh, APS - 27) | 99.7 | 0.10 | — | — | — |
| Alcoa Hydral 710 $Al_2O_3$ (APS - 1.4) | 0.04 | 65.4 | — | — | 0.45 |
| Alcoa A-2 $Al_2O_3$ (APS - 5.8) | 0.02 | 99.2 | — | — | 0.45 |

APS = Average Particle Size in Microns

EXAMPLE 1

Honeycombed substrates such as those disclosed in U.S. Pat. No. 3,790,654 were extruded from raw material batches with forming aids listed in Table II. The forming aids were methyl cellulose obtained from Dow Chemical Company under the tradename of Methocel 4000-MC and diethylene glycol stearate sold under the tradename of Pegosperse 100-S by Glyco Chemical Corporation.

Analytical compositions of the raw materials are given above in Table I. For low expansions and better refractoriness it is desirable that the purity of raw materials be kept quite high, especially with respect to lime which should be kept below 0.1% and alkali (soda plus potash) which should be below 0.4%.

TABLE II

| Batch Formulations (Percent by Weight) | | | | | |
|---|---|---|---|---|---|
| | 802 | 803 | 804 | 805 | 806 |
| Georgia Kaolin Hydrite MP | 6.48 | 12.83 | 25.15 | 31.12 | 36.98 |
| Georgia Kaolin Glomax LL | 38.19 | 32.40 | 21.17 | 15.72 | 10.38 |
| Pfizer MP 96–28 | 41.45 | 41.03 | 40.21 | 39.82 | 39.43 |
| Alcoa A-2 | 13.88 | 13.74 | 13.47 | 13.34 | 13.21 |
| Dow Methocel 4000-MC | 4.50 | 4.50 | 4.50 | 4.50 | 4.50 |
| Glyco Chemical Pegosperse 100-S | 0.50 | 0.50 | 0.50 | 0.50 | 0.50 |

The dry raw materials were plasticized with 27–32% water and blended together in a muller type mixer with the extrusion aids until the mass was plastically formable by extrusion. The plastic mass was pre-extruded into thin (about ⅛-inch diameter) threads known as spaghetti to de-air the mix and then extruded through a die such as disclosed in U.S. Pat. No. 3,790,654. The extruded cylindrical substrates were 4.66 inches in diameter and cut to either 16 inches or 32 inches in length. Each substrate had a thick outer skin covering a matrix of thin (10 mils) walls forming 200 square open-ended cells per square inch of transverse cross-section, the cells extending from one end of the substrate to the other end.

The monolithic substrates were dielectrically dried and fired in a gas-air furnace to about 800° at approximately 50° C/hour, then to about 1405° at approximately 40° C/hour where the temperature was held for 12 hours before cooling at approximately 250° C/hour to room temperature. Properties of the fired ware were as shown in Table III. Coarse porosity was determined by the mercury intrusion method. The crack rating is a relative grading based on observable cracks in each substrate and face with "0" meaning no cracks and "5" meaning large, intersecting cracks. The coefficient of thermal expansion was taken over the range of 25°-1000° C.

sition 201 (100% raw clay) was altered to provide a 12 hour hold at about 260° C because of the hydrated alumina in that batch. The raw batches were as follows:

TABLE IV

| | Batch Formulations (Percent by Weight) | 801 | 201 |
|---|---|---|---|
| Georgia Kaolin | Hydrite MP (Kaolin Clay) | 25.18% | 46.44% |
| Georgia Kaolin | Glomax LL (Calcined Clay) | 11.89 | — |
| Pfizer | MP 96-28 (Raw Montana talc | 40.25 | 18.57 |
| Pfizer | MP 99-54 (Calcined talc) | — | 17.58 |
| Alcoa | Hydral 710 (Hydrated alumina) | — | 14.30 |
| Alcoa | A-2 -325 mesh (Calcined alumina) | 17.65 | 3.12 |
| Penn. Glass Sands Corp. | Supersil -200 mesh (Quartz) | 5.03 | — |
| Dow Methocel | MC - 4000 (metyl cellulose) | 4.50 | 4.50 |
| Glyco Chemicals Inc. | Pegosperse 100-S (diethylene glycol stearate) | 0.50 | 0.50 |

Composition 801 contained, in addition to the clay, talc and alumina, a 5.03% addition of −200 Tyler mesh quartz to increase coarse porosity in the fired body. This type of addition is disclosed and claimed in the previously noted copending U.S. application Ser. No. 412,863.

The mercury porosity of both fired bodies was 38–39%, but the mean pore size for substrates made from 801 was 8.0 microns, better than 1 micron larger than the mean pore size for substrates made from 201. Coefficients of thermal expansion (25°–1000° C) were $8.5 \times 10^{-7}/°$ C and $11 \times 10^{-7}/°$ C for bodies 801 and 201 respectively.

The largest divergence in the fired ware properties

TABLE III

| | Sample Number | | | | | | |
|---|---|---|---|---|---|---|---|
| | 802 | 803 | 804 | 804 | 804 | 805 | 806 |
| Raw Clay (Weight %) | 6.5 | 12.8 | | 25.2 | | 31.1 | 37.0 |
| Expansion Coefficient, Axial ($\times 10^{-7}/°$ C) | 6.0 | 5.6 | 8.0 | 7.6 | 7.5 | 7.8 | 7.1 |
| Hg Porosity (%) | 35 | 33 | 32 | 32 | 32 | 34 | 35 |
| Mean Pore Size ($\mu$m) | 7.7 | 7.3 | 6.9 | 6.0 | 7.0 | 7.2 | 8.0 |
| % of Pores >10$\mu$m diameter | 45 | 43 | 41 | 37 | 40 | 43 | 44 |
| Fired Shrinkage (%) | 4.8 | 5.0 | 4.7 | 4.4 | 4.0 | 4.0 | 3.2 |
| Total Shrinkage (%) (Diametrical) | 7.7 | 7.1 | 6.4 | 6.9 | 6.6 | 6.5 | 6.6 |
| Crack Rating | | | | | | | |
| 16" Length (each end) | 0-0 | 0-1 | 0-0 | 0-0 | 0-0 | 0-1 | 3-4 |
| 32" Length (each end) | — | — | 0-0 | 0-0 | 0-0 | 1-1 | — |

4.66 inch Diameter
200 cells/inch²

Compositions 802 and 803 may be acceptable by their properties although they were difficult to extrude. Three separate extrusions were made using composition 804 and each was examined as to properties. The inventors believe that the best mode of carrying out the present invention is exemplified by the procedure of Example 1 using composition 804.

As the raw clay exceeded 31% in the raw batch both ends of the fired substrates began showing hairline cracks and as the raw clay was further increased the face ends of the substrates showed large but discontinuous cracks denoted by a crack rating of 3 on one end and 4 on the other.

EXAMPLE 2

A composition according to the invention (Number 801) was compared against a composition containing 100% raw clay (Number 201). Both compositions were formulated, processed, formed and fired as in the previous example, except that the firing schedule for composition 201 showed large discontinuous cracks and ratings of 3 and 4 on the two ends. Substrates of composition 801 showed no visible cracking.

Herein throughout the specification, references to material percentages are always on the weight basis unless otherwise specified.

We claim:

1. A method of producing a crack-free monolithic polycrystalline sintered ceramic substrate having a matrix of thin walls forming a multiplicity of open-ended cells extending from one end of the substrate to the other end thereof and predominantly consisting of cordierite, the method comprising the steps of formulating a batch of ceramic raw materials, blending, plasticizing and forming the batch into a green body having said matrix, and drying and sintering the green body, and wherein the improvement comprises:

formulating the batch of raw materials consisting essentially of a mixture of raw clay, calcined clay, talc selected from raw talc and calcined talc, and alumina selected from hydrated alumina and calcined alumina, each of the raw materials included in the batch in an effective amount, in combination with the other raw materials therein, for yielding the sintered substrate whose predominant crystal phase is cordierite, and the effective amount of clay consists of, based by weight on the whole batch, 10–31% raw clay with the balance being at least about 12% calcined clay.

2. The method of producing a substrate according to claim 1 wherein the substrate is generally cylindrical, 3–6 inches in diameter, and 10–40 inches long, and wherein the raw materials are selected in an effective amount for yielding a sintered substrate with a chemical oxide analysis of, by weight, 12.5–15.5% MgO, 34.2–39.5% $Al_2O_3$ and 48.0–51.6% $SiO_2$ and at least 90% by volume cordierite phase.

3. The method of claim 2 wherein the raw clay is selected from laminated kaolin, delaminated kaolin, and mixtures thereof.

4. The method of claim 2 wherein the raw materials are selected from raw clay, calcined clay, raw talc, calcined talc and calcined alumina.

5. The method of claim 4 wherein the improvement further includes firing the green body to a peak temperature and for a time sufficient to produce the predominent cordierite phase in the sintered substrate and wherein the rate of temperature increase in reaching the peak temperature does not exceed about 100° C per hour.

6. The method of claim 4 wherein the raw clay is selected from laminated kaolin, delaminated kaolin, and mixtures thereof.

* * * * *

UNITED STATES PATENT AND TRADEMARK OFFICE
CERTIFICATE OF CORRECTION

PATENT NO. : 4,001,028
DATED : January 4, 1977
INVENTOR(S) : Rodney I. Frost, Irwin M. Lachman, Paul H. Rieth It is certified that error appears in the above-identified patent and that said Letters Patent are hereby corrected as shown below:

Column 1, line 16, after 412,862 insert -- (Now U.S. Patent 3,885,977) -- .

Column 5, line 28, change "and" preceding face to -- end -- .

Signed and Sealed this

Fifth Day of April 1977

[SEAL]

Attest:

RUTH C. MASON
Attesting Officer

C. MARSHALL DANN
Commissioner of Patents and Trademarks